US007004995B2

(12) United States Patent
Schroder et al.

(10) Patent No.: US 7,004,995 B2
(45) Date of Patent: Feb. 28, 2006

(54) TRIBOELECTRIC CHARGING OF WOVENS AND KNITTED FABRICS

(75) Inventors: Andreas Schroder, Hamburg (DE); Claus Grobe, Hamburg (DE); Jens Kranz, Hamburg (DE); Dieter Wenninger, Singapore (SG)

(73) Assignee: tesa Aktiengesellschaft, Hamburg (DE)

( * ) Notice: Subject to any disclaimer, the term of this patent is extended or adjusted under 35 U.S.C. 154(b) by 158 days.

(21) Appl. No.: 10/380,889

(22) PCT Filed: Oct. 23, 2001

(86) PCT No.: PCT/EP01/12233

§ 371 (c)(1),
(2), (4) Date: Aug. 29, 2003

(87) PCT Pub. No.: WO02/34364

PCT Pub. Date: May 2, 2002

(65) Prior Publication Data

US 2004/0045441 A1    Mar. 11, 2004

(30) Foreign Application Priority Data

Oct. 26, 2000  (DE) ............................... 100 53 227

(51) Int. Cl.
*B03C 3/30*    (2006.01)
(52) U.S. Cl. .............. 95/59; 55/524; 55/528; 55/DIG. 39; 55/DIG. 43; 55/DIG. 45; 96/17; 96/69
(58) Field of Classification Search ............ 96/15, 96/17, 69; 55/524, 528, DIG. 39; 95/59
See application file for complete search history.

(56) References Cited

U.S. PATENT DOCUMENTS

| 2,612,966 | A | * | 10/1952 | Nicol ............................. 96/17 |
| 2,875,845 | A | * | 3/1959 | Penney .......................... 96/85 |
| 3,307,332 | A | * | 3/1967 | Grace et al. ................... 96/17 |
| 3,563,004 | A | * | 2/1971 | Schouw ......................... 96/17 |
| 3,736,727 | A | * | 6/1973 | Shriner ......................... 96/17 |
| 4,501,598 | A | * | 2/1985 | Long .............................. 95/63 |
| 4,789,504 | A | | 12/1988 | Ohmori et al. ........ 55/DIG. 39 |
| 5,037,455 | A | * | 8/1991 | Scheineson et al. ........... 96/17 |
| 5,419,953 | A | * | 5/1995 | Chapman ..................... 442/35 |
| 5,709,735 | A | * | 1/1998 | Midkiff et al. ................. 96/17 |
| 5,728,199 | A | * | 3/1998 | von Glehn ..................... 96/17 |
| 5,888,274 | A | * | 3/1999 | Frederick ....................... 95/59 |
| 5,906,677 | A | * | 5/1999 | Dudley .......................... 96/17 |
| 5,989,303 | A | * | 11/1999 | Hodge ......................... 55/486 |
| 5,989,320 | A | * | 11/1999 | Rutkowski .................... 96/55 |
| 6,328,788 | B1 | * | 12/2001 | Auger ............................ 96/17 |

FOREIGN PATENT DOCUMENTS

| DE | 4321289 | * | 1/1955 |
| DE | 2714852 | * | 10/1977 |
| DE | 30 45 723 A1 | | 7/1982 |
| DE | 35 09 857 A1 | | 9/1985 |
| DE | 39 04 623 A1 | | 8/1990 |
| DE | 9205948 | * | 2/1993 |
| DE | 43 00 422 A1 | | 7/1993 |
| DE | 43 07 398 A1 | | 12/1994 |
| DE | 44 14 728 A1 | | 11/1995 |
| DE | 198 19 989 A1 | | 11/1999 |
| WO | 99/58224 | * | 11/1999 |

OTHER PUBLICATIONS

Gaynor et al; "Electrostatic charge characteristics of Der p1 allergen-carrying particles and the house dust mite dermatophagoides pteronyssinus"; Medical & Biological Engineering & Computing; vol. 36, pp. 351-354; May 1998.*

* cited by examiner

Primary Examiner—Richard L. Chiesa
(74) Attorney, Agent, or Firm—Norris McLaughlin & Marcus PA

(57) ABSTRACT

A method for the utilization of a woven or loop-formingly knitted fabric which acquires an electrostatic charge as a result of a specific treatment for filtering airborne, dusty allergens such as pollen in a pollen guard mountable in front of windows and doors over the whole area thereof.

8 Claims, No Drawings

TRIBOELECTRIC CHARGING OF WOVENS AND KNITTED FABRICS

This application is a national stage of International Application No. PCT/EP01/12233, filed on Oct. 23, 2001.

This invention relates to a woven or loop-formingly knitted fabric which acquires an electrostatic charge as a result of a specific treatment and also the utilization of this charge for filtering airborne, dusty allergens such as pollen in a pollen guard mountable in front of windows and doors over the whole area thereof.

The incidence of pollinosis (hay fever), ie the allergic reaction of the mucous membranes of the eye and of the upper and lower respiratory tracts with flower pollen and other airborne allergens, in the population has been monitored in Germany for a number of years. It was found that about 11–15% of the population is affected. The allergic reaction of a pollen allergy usually manifests itself in reddening and lacrimation of the eyes (conjunctivitis), sneezing episodes (rhinitis) and a dry cough (bronchial asthma) as early reactions. Known late reactions to pollen allergy include for example neurodermatitis or eczema. As well as the personal symptoms, there are more far-reaching consequences such as loss of earnings or work incapacity during the pollen season or increased medical treatment costs, so that there is an immense need for a gridlike pollen guard within the meaning of the invention for attachment in front of the windows and offices of living and working areas. Further information about pollinosis is available in Ratgeber Pollenallergie, Ute Künkele, Munich 1992.

Guard systems attached in front of windows and doors over the whole area thereof in order that the penetration of comparatively large objects such as insects into living areas may be prevented are known (=flyscreens). DE 3045723 describes for example net curtains, nets, filters or sieves for such a purpose that are attached to window or door frames by means of press studs. Owing to their relatively large mesh sizes of 1–2 mm, these possess good visual transparency and provide the living areas with adequate airing, but the comparatively large mesh size does not provide adequate protection against pollen (size about 10–50 $\mu$m) and fungal spores (size about 200 $\mu$m).

Filtration means whereby air is completely cleaned of pollen, germs and spores find use in air conditioning and automobiles. The high filtering effect is achieved in DE 3904623 for example through the use of single- or else often multi-ply filter mats formed from nonwovens which, owing to their fibrous nature, make the filter stage impassable to the above-mentioned allergens. To intensify the contact of the particle-laden air with the filter, the laminate of filter mats is additionally folded in a zigzag shape. However, owing to their nonexistent visual transparency, such filter mats have no utility as a protective or guard apparatus within the meaning of the present invention.

It is further possible to remove pollen from air flowing into an indoor amenity by means of a woven or loop-formingly knitted fabric solely by adjusting the mesh size. The sizes of most of the allergenic pollens occurring in Europe, essentially birch, grasses, goose-foot, wormwood, plantain, hazel, are in the region of 20–40 $\mu$m. The maximum feasible mesh size for purely mechanical filtration is therefore 20 $\mu$m, and this is too small to provide visual transparency.

A further window guard against pollen, germs and spores is disclosed for example in DE 4300422. A textile material is attached in front of the windowpane, not over the whole area thereof, but in the two wedgelike interstices and also the rectangular opening at the upper side of a window in tilt position. This form of attachment circumvents the problem of the nonexistent visual transparency of the textile material, but to completely open the window the textile material has to be removed, so that there is no longer any protective effect.

The enhancement of the separating properties of filtration media by electrostatic charges is known and is used for example for filtration duties in air conditioning technology, ventilation technology for automobiles or cleaning operations of industrial processes. The principle underlying these electrofilters is that different potentials have been applied to at least two electrodes, so that a high voltage field is created between the electrodes. One of the two electrodes acts as an ionization source for gas molecules, so that these are accelerated in the direction of the collecting electrode. En route to the collecting electrode, the gas molecules confer their charge to dust particles and cause the dust particles to be transported to the collecting electrode, to deposit there and so be removed from the air stream to be cleaned. DE 19819989.2, for example for such duty in automotive technology, describes an electrode arrangement where the ionization electrode is present in a pipe as an axially disposed wire and the collecting electrode is present as a woven or wire netting on the pipe wall. The principle of applying an external voltage to improve the filtration properties of a pollen guard is not suitable for a woven or loop-formingly knitted fabric which is to be mounted in front of windows and doors.

A further use of electrostatic charges for similar filtration duties is also described in DE 4414728. The charging of net-shaped wovens in synthetic high-polymeric fibers is used to create between the allergen and the fabric an electric field which is to be utilized for filtration. However, no details are provided as to how the electrostatic charge is applied.

It is an object of the present invention to utilize the triboelectric charging of polymeric and natural fibers for filtering airborne pollen in the form of a woven or loop-formingly knitted fabric which can be mounted in front of windows and doors.

The principle of applying a triboelectric charge is based on the separation of charges, brought about on a macroscopic scale by rubbing or separating at least two materials. The sign and the magnitude of the charge are determined initially by the escape energies $W_e$ of the near-surface electrons of the materials, since near-surface electrons escape from the surface of one material and pass into that of the other. Consequently, an electron deficiency will develop in the surface of one material, causing this surface to become positively charged, whereas the other surface acquires a negative charge due to the excess electrons. It is discernible from Lüttgens/Glor: Elektrostatische Aufladungen begreifen und sicher beherrschen; 2nd edition, that for very rapid and high charging of the materials, as envisioned in the invention, the difference in their electron escape energies has to be very large.

As well as the electron escape energies, other parameters affecting a process of triboelectric charging are such as the temperature, roughness and degree of contamination of the surfaces, the rubbing or separating speed and also the humidity.

The discharging of the electrostatic charge is suppressed when the volume resistance, and also the surface resistance, of the materials is of the order of $10^{12}$–$10^{15}$ Ω. The woven or loop-formingly knitted fabric therefore preferably utilizes fibers, or coatings applied to the fabric, having surface resistances of $10^{12}$–$10^{15}$ Ω.

The woven or loop-formingly knitted fabric preferably comprises fibers or coatings consisting of one or more pure or heteroatom-containing hydrocarbons.

The diameter of the threads making up the woven or loop-formingly knitted fabric is preferably between 50 and 1,000 μm.

Preferably, the woven or loop-formingly knitted fabric comprises meshes having open areas between 300 and 90,000 μm².

Electrostatic charging by charge separation may be effected for example by the rapid removal of a polymeric film attached to the fabric, on either or both sides, over the whole area thereof without air inclusions. Charging is likewise possible by the friction of particle-laden air against the fabric when air is passed at high speed through the fabric by means of a hand-held hair-dryer, an industrial air blower, including a hand-held industrial air blower, a ventilator or a fan.

The preferred way for the purposes of the present invention is the manual rubbing of a polymeric or natural material against the fabric after it has been attached in front of the window.

As well as utilizing the electrostatic charge for filtering pollen, this invention provides the properties of sufficient air perviousness and adequate visual transparency, since the mesh size needed for filtration can be increased beyond the pollen diameter.

In the event of a discharge occurring, for example as a result of increased atmospheric humidity or rain, the charge can be reestablished after the precipitation by drying and subsequent rubbing with the appropriate polymeric material. Another possibility is to dry and recharge in one operation, solely by using a hand-held hair-dryer to blow particle-laden air through the fabric.

What is claimed is:

1. A method for filtering airborne allergens from passage through an open window or door to a living space which comprises covering the opening of said window or door with a rechargeable electrostatic fabric filter having light and air transmitting openings, wherein the filter is formed by woven or loop formed threads which have openings therebetween, said openings having a diameter of greater than 20 μm and an area of between 300 and 90,000 μm2, said threads having diameters of between 50 and 1,000 μm and being comprised of a triboelectric material which is electrostatically chargeable by frictional engagement of the threads with a moving other material and said filter having a surface resistance of between $10^{12}$ and $10^{15}$ ohms.

2. The method of claim 1, wherein said frictional engagement comprises manual rubbing of the threads with the other material.

3. The method of claim 2, wherein the other material is a polymeric material.

4. The method of claim 1, wherein said frictional engagement comprises blowing air through the fabric filter.

5. The method of claim 1, wherein the threads are formed of one or more hydrocarbon materials which optionally include heteroatom containing hydrocarbons and the surfaces of the threads have a surface resistance of between $10^{12}$ and $10^{15}$ ohms.

6. The method of claim 1, wherein the threads are one or more hydrocarbon materials which can include heteroatom containing hydrocarbons and the threads are coated, the coating having a surface resistance between $10^{12}$ and $10^{15}$ ohms.

7. In a building having an opening to the exterior of said building, the improvement which comprises a covering over said opening comprised of a rechargeable electrostatic fabric filter having light and air transmitting openings, wherein the filter is formed by woven or loop formed threads which have openings therebetween, said openings having a diameter of greater than 20 μm and an area of between 300 and 90,000 μm2, said threads having diameters of between 50 and 1,000 μm and being comprised of a triboelectric material which is electrostatically chargeable by frictional engagement of the threads with a moving other material and said filter having a surface resistance of between $10^{12}$ and $10^{15}$ ohms.

8. A rechargeable electrostatic fabric filter having light and air transmitting openings, formed by woven or loop formed threads which have openings therebetween, said openings having a diameter of greater than 20 μm and an area of between 300 and 90,000 μm², said threads having diameters of between 50 and 1,000 μm and being comprised of a triboelectric material which is electrostatically chargeable by frictional engagement of the threads with a moving other material and said filter having a surface resistance of between $10^{12}$ and $10^{15}$ ohms.

* * * * *